United States Patent
Saito

(10) Patent No.: US 9,256,818 B2
(45) Date of Patent: Feb. 9, 2016

(54) PRINTING APPARATUS, METHOD, AND STORAGE MEDIUM FOR CONTROLLING DISCHARGE ORIENTATION

(71) Applicant: CANON KABUSHIKI KAISHA, Tokyo (JP)

(72) Inventor: Sho Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/561,105

(22) Filed: Dec. 4, 2014

(65) Prior Publication Data
US 2015/0161492 A1 Jun. 11, 2015

(30) Foreign Application Priority Data
Dec. 5, 2013 (JP) ................................. 2013-252287

(51) Int. Cl.
*G06K 15/00* (2006.01)
*G06K 15/16* (2006.01)

(52) U.S. Cl.
CPC .............. *G06K 15/403* (2013.01); *G06K 15/16* (2013.01); *G06K 2215/0088* (2013.01)

(58) Field of Classification Search
CPC .................. H04N 1/00482; H04N 2201/3216; H04N 1/00625; H04N 1/32486; G03G 15/6552; G03G 2215/00421; G03G 2215/00556; G03G 15/65; G03G 2215/00759; G03G 15/04018; G03G 2215/00902
See application file for complete search history.

(56) References Cited

U.S. PATENT DOCUMENTS

| | | | | |
|---|---|---|---|---|
| 6,104,498 | A  * | 8/2000 | Shima et al. | 358/1.14 |
| 6,168,327 | B1 * | 1/2001 | Tsuzuki | 400/188 |
| 8,693,011 | B2 * | 4/2014 | Mori | 358/1.12 |
| 2013/0070302 | A1 * | 3/2013 | Tsuchitoi et al. | 358/1.18 |

FOREIGN PATENT DOCUMENTS

JP 11-235857 A 8/1999

* cited by examiner

*Primary Examiner* — Thomas D Lee
(74) *Attorney, Agent, or Firm* — Canon USA Inc. IP Division

(57) ABSTRACT

A printing apparatus is provided that, in a case where copy numbers are printed on the single-sheet document and the sheets are then discharged, prevents the copy numbers from going out of order while preventing the time it takes to complete printing from being extended. A method for controlling such a printing apparatus includes performing control such that, in a case where processing of printing an image on a single sheet per copy is carried out for a plurality of copies, the sheet on which the image is printed is discharged in a face-up state or in a face-down state depending on printing of the copy number.

13 Claims, 13 Drawing Sheets

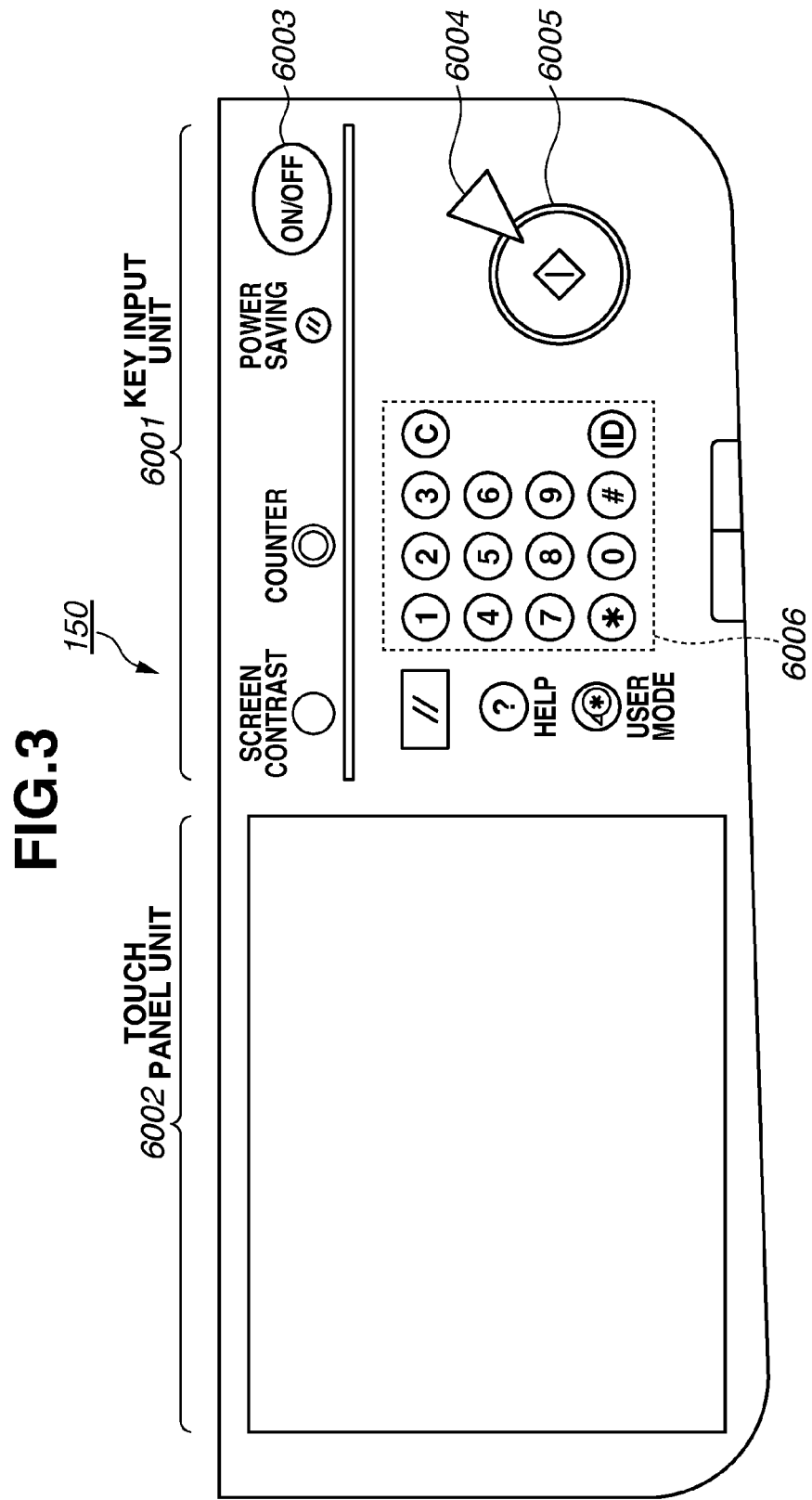

PRINTED MATERIAL OBTAINED WHEN
PRINTING COPY ON PLURAL-SHEET
DOCUMENT (WITHOUT COPY NUMBER)

PRINTED MATERIAL OBTAINED
WHEN FRONT AND BACK
OF SHEET ARE REVERSED

PRINTED MATERIAL OBTAINED WHEN
PRINTING COPY ON SINGLE-SHEET
DOCUMENT (WITHOUT COPY NUMBER)

PRINTED MATERIAL OBTAINED WHEN
PRINTING PLURAL COPIES ON SINGLE-SHEET
DOCUMENT (WITHOUT COPY NUMBER)

PRINTED MATERIAL
OBTAINED WHEN PRINTING
PLURAL COPIES OF
SINGLE-SHEET DOCUMENT
(WITH COPY NUMBER)

PRINTED MATERIAL
OBTAINED WHEN PRINTING
PLURAL COPIES OF
SINGLE-SHEET DOCUMENT
(WITH COPY NUMBER)

RESULT OBTAINED WHEN
FRONT AND BACK OF
SHEET ARE REVERSED

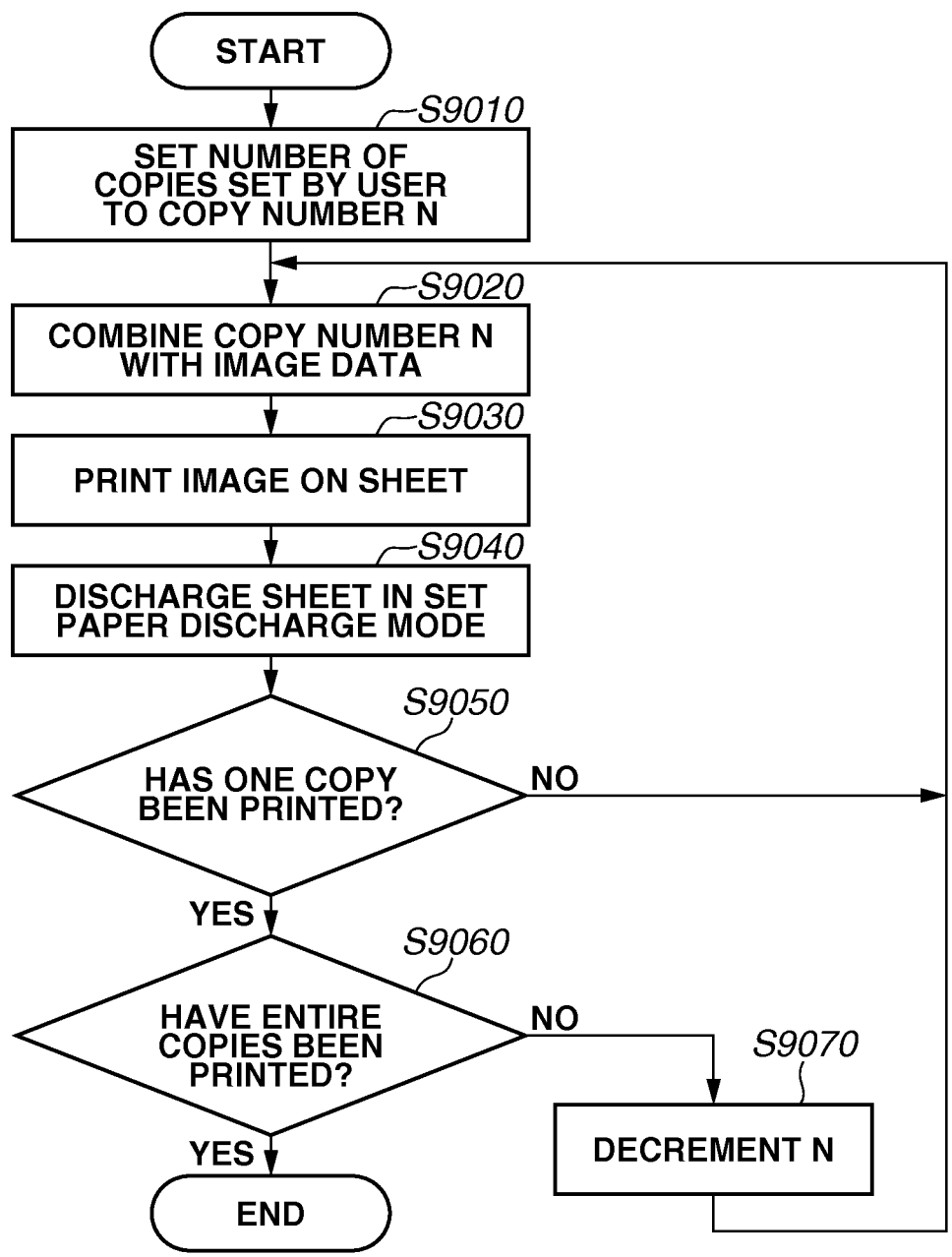

PRINTING APPARATUS, METHOD, AND STORAGE MEDIUM FOR CONTROLLING DISCHARGE ORIENTATION

BACKGROUND OF THE INVENTION

1. Field of the Invention

The present disclosure generally relates to printing and, more particularly, to printing apparatuses, methods for controlling printing apparatuses, and storage media.

2. Description of the Related Art

There exists a printing apparatus that prints an image on a sheet, reverses the sheet on which the image has been printed through a reversing path, and discharges the sheet to a paper discharge unit in a face-down state (see Japanese Patent Application Laid-Open No. 11-235857).

In this case, since the printing apparatus reverses and then discharges a sheet, the printing apparatus can discharge sheets in the correct order according to the page number even when the printing apparatus prints an image starting from the first page. Therefore, the printing apparatus can start printing even when the image data of the entire pages has not been stored, and thus the time it takes to complete printing can be reduced.

In addition, with the printing apparatus discussed in Japanese Patent Application Laid-Open No. 11-235857, as long as the printing apparatus executes a job of printing an image on a single sheet per copy, the pages do not go out of order even when the printing apparatus discharges sheets in a face-up state, and thus the printing apparatus can discharge the sheet on which an image has been printed without reversing the sheet. Therefore, in a case where the printing apparatus prints an image on a single sheet per copy, the time it takes to complete printing can be reduced by an amount of time it takes to reverse a sheet.

In the conventional technique, however, even in a case where an image is printed on a single sheet per copy, if a plurality of copies is to be printed and copy numbers are to be printed on the sheets of the respective copies, the sheets that are discharged in a face-up state are not arranged in the correct order according to the copy numbers.

In this case, for example, a sheet bundle illustrated in FIG. 7A is discharged. In FIG. 7A, copy number 1 is printed on a first sheet discharged in a face-up state; copy number 2 is printed on a second sheet discharged in a face-up state placed over the first sheet; and copy number 3 is printed on a third sheet discharged in a face-up state.

A user then needs to exchange the first sheet and the third sheet in order to arrange the printed material in the order of the copy numbers starting from 1.

SUMMARY OF THE INVENTION

According to an aspect of the present disclosure, a printing apparatus includes a determination unit configured to determine whether a copy number is to be printed on a sheet, and a control unit configured to perform control such that, in a case where processing of printing an image on a single sheet per copy is carried out for a plurality of copies and the determination unit determines that the copy number is not to be printed on the sheet, the sheet on which the image is printed is discharged in a face-up state, and to perform control such that, in a case where processing of printing an image on a single sheet per copy is carried out for a plurality of copies and the determination unit determines that the copy number is to be printed on the sheet, the sheet on which the image is printed is discharged in a face-down state.

Further features of the present disclosure will become apparent from the following description of exemplary embodiments with reference to the attached drawings.

BRIEF DESCRIPTION OF THE DRAWINGS

FIG. 3 is a diagram an illustrating an operation unit according to the present exemplary embodiment.

FIG. 13 is a flowchart of a control example according to the present exemplary embodiment.

DESCRIPTION OF THE EMBODIMENTS

Various exemplary embodiments, features, and aspects of the disclosure will be described in detail below with reference to the drawings.

Exemplary embodiments described hereinafter do not limit the scope of the present disclosure set forth in the claims, and not all of the combinations of features described in the exemplary embodiments are essential in the present disclosure.

Figure 1:
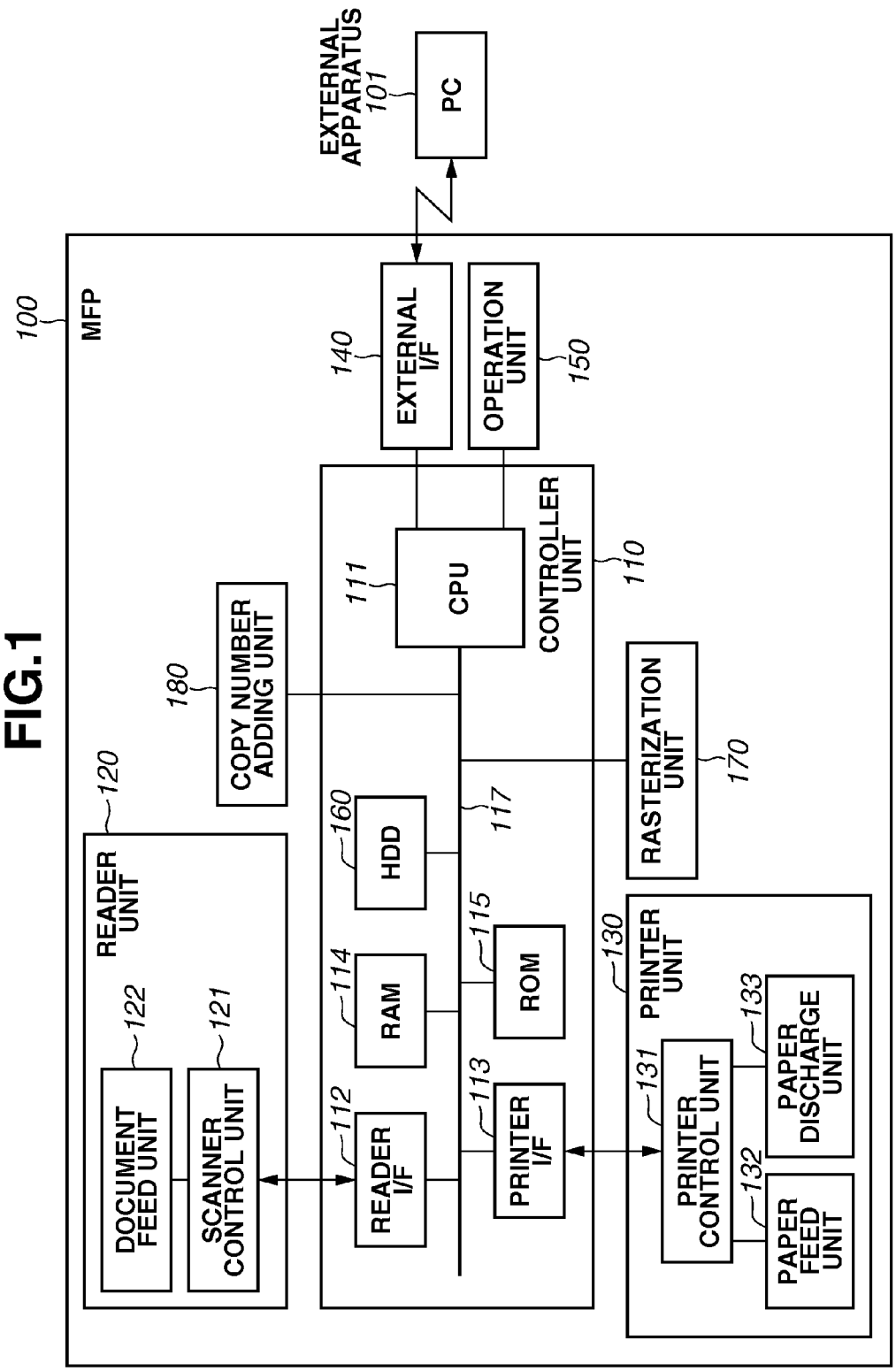
FIG. 1 is a block diagram illustrating a configuration of an image processing apparatus according to the present exemplary embodiment.

A printing system according to a first exemplary embodiment of the present disclosure will be described with reference to FIG. 1. The printing system according to the present exemplary embodiment includes a multifunctional peripheral (MFP) 100, which is an example of a printing apparatus, and a personal computer (PC) 101, which is an external information processing apparatus.

The MFP 100 has a document reading function by which the MFP 100 reads an image of a document and generates image data of the read image. In addition, the MFP 100 has a printing function by which the MFP 100 prints an image on a sheet based on image data generated by reading a document or image data received from the PC 101. Although the MFP 100 is described as an example of the printing apparatus in the present exemplary embodiment, the printing apparatus may be a single functional peripheral (SFP) as long as such a printing apparatus has a printing function. In addition, although the MFP 100 that prints a monochrome image is described as an example in the present exemplary embodiment, the MFP 100 may be configured to print a color image.

The PC 101 generates image data with application software and transmits the generated image data to the MFP 100. Although the PC 101 is described as an example of an external information processing apparatus in the present exemplary embodiment, an external information processing apparatus is not limited to the PC 101 and may be a portable information terminal, such as a personal digital assistant (PDA) and a smartphone.

The MFP 100 and the PC 101 communicate with each other through a local area network (LAN) or the like. Alternatively, the MFP 100 may communicate with the PC 101 through a wide area network (WAN) or a Universal Serial Bus (USB) cable. As another alternative, the MFP 100 may communicate with the PC 101 through wireless communication, such as wireless fidelity (Wi-Fi) and Bluetooth (registered trademark).

The MFP 100 includes a controller unit (control unit) 110, a reader unit 120, a printer unit 130, an external interface (I/F) 140, an operation unit 150, a rasterization unit 170, and a copy number adding unit 180. These units are electrically interconnected to transmit and receive control commands and data. As used herein, the term "unit" generally refers to any combination of software, firmware, hardware, or other component that is used to effectuate a purpose.

The reader unit 120 includes a scanner control unit 121 and a document feed unit (DF unit, also referred to as ADF) 122. The scanner control unit 121 controls communication between the reader unit 120 and the controller unit 110, and the document feed unit 122 feeds a document. The controller unit 110 instructs the reader unit 120 to read a document through the scanner control unit 121. The reader unit 120 optically reads an image of a document in accordance with an instruction to read the document and converts the image to image data in the form of an electric signal. Although an example in which the controller unit 110 instructs the reader unit 120 to read a document through the scanner control unit 121 is described hereinafter in the present exemplary embodiment, the present disclosure is not limited to such an example. In the case of an MFP in which the reader unit 120 does not include the scanner control unit 121, a central processing unit (CPU) 111 of the controller unit 110 may directly instruct the reader unit 120 to read a document.

The printer unit 130 includes a printer control unit 131 that controls communication between the printer unit 130 and the controller unit 110. The printer unit 130 further includes a paper feed unit 132 and a paper discharge unit 133. The paper feed unit 132 includes a plurality of sheet storing units (paper feed stages) for storing sheets to be used for printing, and the paper discharge unit 133 carries out stapling processing and shift processing on printed materials. The controller unit 110 instructs the printer unit 130 to print image data through the printer control unit 131. The printer unit 130 then forms (prints) an image on a sheet fed from one of the paper feed stages by using toner based on the image data and transfers and fixes the image data. Although an example in which the controller unit 110 instructs the printer unit 130 to print image data through the printer control unit 131 is described hereinafter in the present exemplary embodiment, the present disclosure is not limited to such an example. In a case of an MFP in which the printer unit 130 does not include the printer control unit 131, the CPU 111 of the controller unit 110 may directly instruct the printer unit 130 to print image data.

The MFP 100 includes the operation unit 150, which includes a display unit.

The operation unit 150 includes the display unit and hard keys. The display unit includes a liquid crystal display (LCD) and a touch panel sheet formed of a transparent electrode (or which may be of an electrostatic capacity type) affixed to the LCD. An operation screen or a screen indicating the status of the MFP 100 is displayed on the LCD. The operation unit 150 has a function of receiving various settings from a user through the touch panel sheet or the hard keys and a function of providing the user with information through the screen displayed on the LCD.

The rasterization unit 170 analyzes print data and rasterizes the print data to be image data.

The copy number adding unit 180 generates copy number image data that indicates copy numbers to be printed on sheets and combines the copy number image data with image data to be printed. In the present exemplary embodiment, an example in which numerals (copy 1, copy 2, copy 3, . . . ) are used for the copy numbers is described. If copy numbers are printed on sheets and if, when a distributor distributes the sheets to a plurality of users, the copy numbers and the users receiving the sheets with the respective copy numbers are managed, even in a case where information on the sheet is leaked, the copy numbers make it possible to identify a receiver who has leaked the sheet.

The controller unit 110 includes the CPU 111, a random access memory (RAM) 114, a read only memory (ROM) 115, a hard disk drive (HDD) 160, a reader I/F 112, and a printer I/F 113.

The CPU 111 controls processing and operations of various units provided in the MFP 100. The ROM 115 is a read only memory and stores programs, such as a boot sequence and font information, in advance. Meanwhile, the RAM 114 is a read-and-write enabled memory and stores image data transmitted from the reader unit 120 or the external I/F 140, various programs, setting information, and so forth.

The HDD 160 is a large-capacity non-volatile memory that stores image data and programs. Although the HDD 160 is described as an example of a large-capacity non-volatile memory in the present exemplary embodiment, an alternative non-volatile memory, such as a digital versatile disc (DVD) a Blu-ray Disc, a solid state drive (SSD), may be used.

The reader I/F 112 is an interface for connecting the controller unit 110 and the reader unit 120 and controls an exchange of data and commands between the controller unit 110 and the reader unit 120. The printer I/F 113 is an interface for connecting the controller unit 110 and the printer unit 130 and controls an exchange of data between the controller unit 110 and the printer unit 130. For example, the controller unit 110 transmits a command to drive a motor for rotating a conveying roller that conveys a sheet or a command to form an image to the printer unit 130 through the printer I/F 113. In addition, the controller unit 110 receives a notification regarding the status of the printer unit 130 from the printer unit 130 through the printer I/F 113.

Figure 2:
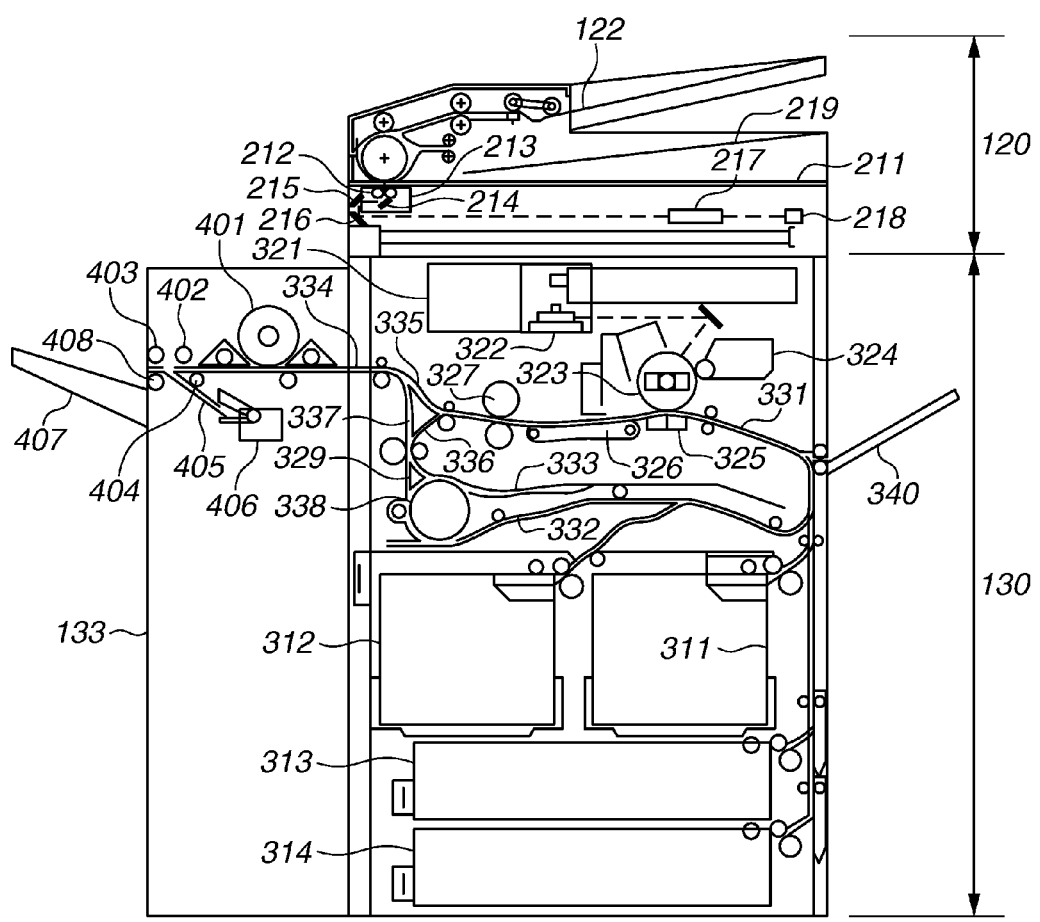
FIG. 2 is a sectional view illustrating a configuration of the image processing apparatus according to the present exemplary embodiment.

Next, the configuration of the MFP 100 will be described with reference to a sectional view illustrated in FIG. 2.

The document feed unit 122 of the reader unit 120 feeds a document, sheet by sheet, set in a document positioning plate. The document is conveyed through an optical unit 213 and is discharged to a paper discharge tray 219.

When the document has been conveyed to a position above the optical unit 213, the reader unit 120 lights a lamp 212, and the optical unit 213 irradiates the document with light. Light reflected by the document is then guided to a charge-coupled device (CCD) image sensor (hereinafter, referred to as a CCD) 218 through mirrors 214, 215, and 216 and a lens 217 and is read by the CCD 218. The CCD 218 reads the reflected light and coverts to image data. The CCD 218 then transfers the image data to the controller unit 110.

The reader unit 120 also reads an image of a document placed between the document feed unit 122 and a platen glass 211. In this case, the reader unit 120 lights the lamp 212 and moves the optical unit 213. Light reflected by the document at this time is guided to the CCD 218 through the mirrors 214, 215, and 216 and the lens 217 and is read by the CCD 218. The CCD 218 reads the reflected light and coverts to image data. The CCD 218 then transfers the image data to the controller unit 110. Although in the example, a sensor unit for condensing the reflected light is a CCD sensor has been described, the sensor is not limited to this type. The sensor unit may be a contact image sensor (CIS). In a case where a CIS is used, the mirrors 214, 215, and 216 and the lens 217 are unnecessary, and the CIS may be provided at a position where the optical unit 213 is provided.

In the printer unit 130, a laser driver 321 drives a laser light emitting unit 322 and causes the laser light emitting unit 322 to emit laser light in accordance with image data output from the controller unit 110. A photosensitive drum 323 is irradiated with the aforementioned laser light, and a latent image is formed on the photosensitive drum 323 in accordance with the laser light. Developer is adhered to a portion of the photosensitive drum 323 where the latent image is formed by a developing unit 324.

The printer unit 130 includes, as the paper feed unit 132, drawer-like cassettes 311 to 314 and a manual feed tray 340. The cassettes 311 to 314 and the manual feed tray 340 can each hold a plurality of sheets. The printer unit 130 feeds a sheet from one of the cassettes 311 to 314 and the manual feed tray 340 and conveys the sheet to a transfer unit 325 through a conveyance path 331. The transfer unit 325 transfers the developer adhered to the photosensitive drum 323 onto the sheet.

The sheet, on which the developer has been transferred, is conveyed to a fixing unit 327 by a conveyance belt 326. The fixing unit 327 fixes the developer to the sheet through heating and pressing. Thereafter, in a case where the sheet that has passed through the fixing unit 327 is to be discharged without being reversed, the sheet passes through a conveyance path 335 and a conveyance path 334 and is discharged to a paper discharge tray 407. In this case, the front and back of the sheet are not reversed, and the sheet is discharged in a face-up state in which the printed side of the sheet faces upward.

Meanwhile, in a case where the sheet is to be discharged with the printed side thereof being reversed, the sheet passes through a conveyance path 336 and is guided to a conveyance path 338. The sheet is then conveyed in the reverse direction and passes through a conveyance path 337 and the conveyance path 334. Thereafter, the sheet is discharged to the paper discharge tray 407. Through this process, the sheet is discharged in a face-down state in which the printed side of the sheet faces downward. The conveyance path 336, the conveyance path 337, and the conveyance path 338 are used to reverse the front and back of a sheet and are collectively referred to as a reversing path.

In a case where two-sided printing is set, the sheet, after passing through the fixing unit 327, passes through the conveyance path 336 and is guided to a conveyance path 333 by a flapper 329. Thereafter, the sheet is conveyed in the reverse direction and is guided to the conveyance path 338 by the flapper 329. The sheet is then guided to a paper re-feed conveyance path 332. The sheet guided to the paper re-feed conveyance path 332 then passes through the conveyance path 331 at the aforementioned timing and is conveyed to the transfer unit 325. Developer is then transferred onto a second side of the sheet by the transfer unit 325. Thereafter, the sheet passes through the fixing unit 327 and is guided to the conveyance path 334.

Regardless of whether one-sided printing or two-sided printing is set, a sheet that has passed through the conveyance path 334 is conveyed to the paper discharge unit 133.

A sheet that has been conveyed to the paper discharge unit 133 is first sent to a buffer unit 401 of the paper discharge unit 133. In the buffer unit 401, the conveyed sheet is wound around a buffer roller for buffering on a case-by-case basis. For example, in a case where stapling processing or the like carried out downstream from the buffer unit 401 takes time, intervals at which sheets are conveyed from the printer unit 130 can be adjusted by using the buffer unit 401.

The sheet is then conveyed through a conveyance path 404 by an upstream discharge roller pair 402 and a downstream discharge roller pair 403 and is loaded on a stack tray 405. Once a sheet stack for a single copy is loaded on the stack tray 405, the loaded sheet stack passes through a conveyance path 408 and is discharged to the paper discharge tray 407.

In a case where the user makes a setting for shifting a sheet stack, a sheet stack loaded on the stack tray 405 is discharged to the paper discharge tray 407 so as to be shifted relative to an immediately preceding discharged sheet stack. Through this, a break between copies becomes intuitive to the user.

In a case where the user makes a setting for stapling a sheet stack, a sheet stack that has been conveyed through the conveyance path 404 by the upstream discharge roller pair 402 and the downstream discharge roller pair 403 and loaded on the stack tray 405 is subjected to stapling processing by a stapling unit 406. The stapled sheet stack is discharged to the paper discharge tray 407 by the downstream discharge roller pair 403.

Although the present exemplary embodiment is described as a monochrome machine that includes a single developing unit 324 and a single photosensitive drum 323, the present disclosure may be applied to a color machine that includes four developing units and four photosensitive drums for the colors of cyan, yellow, magenta, and black. In addition, although a method of printing an image on a sheet through an electrophotographic system is described in the present exemplary embodiment, an image may be printed by an ink jet system. Furthermore, other methods may be employed as long as such methods allow an image to be printed.

Next, the operation unit 150 of the MFP 100 illustrated in FIG. 1 will be described with reference to FIG. 3.

The operation unit 150 includes a key input unit 6001 and a touch panel unit 6002. The key input unit 6001 receives user operations through the hard keys, and the touch panel unit 6002 can display soft keys (display-keys) and receives user operations through the soft keys. Although the operation unit 150 that includes both hard keys and soft keys is described in the present exemplary embodiment, the entire keys may be implemented by soft keys.

The key input unit 6001 will be described first. As illustrated in FIG. 3, the key input unit 6001 includes an operation unit power supply switch 6003. If the user presses the operation unit power supply switch 6003 while the MFP 100 is in a standby mode (normal operation state), the CPU 111 switches the MFP 100 from the standby mode to a sleep mode (state in which power consumption is reduced). Meanwhile, if the user presses the operation unit power supply switch 6003 while the MFP 100 is in the sleep mode, the CPU 111 switches the MFP 100 from the sleep mode to the standby mode.

A start key 6005 receives an instruction from the user to cause the MFP 100 to execute copying and data transmission.

A stop key 6004 receives an instruction from the user to interrupt copying and data transmission.

A numeric keypad 6006 allows the user to set the number of copies and other numerical values.

The touch panel unit 6002 will now be described. The touch panel unit 6002 includes an LCD and a touch panel sheet formed of a transparent electrode affixed to the LCD.

The touch panel unit 6002 has a function of receiving various settings from the user and a function of providing information to the user.

The MFP 100 having the configuration described above can execute a plurality of types of jobs.

For example, the MFP 100 executes a copy job. In the copy job, the MFP 100 reads an image of a document with the reader unit 120, generates image data of the read image of the document, and prints an image on a sheet based on the aforementioned image data and settings received through the operation unit 150.

The MFP 100 also executes a print job. In the print job, the MFP 100 analyzes print data received from the PC 101, generates image data based on print settings received from the PC 101, and prints an image on a sheet based on the generated image data.

The MFP 100 also executes a scan and storage job. In the scan and storage job, the MFP 100 reads an image of a document with the reader unit 120, generates image data of the read image of the document, and stores the image data in the HDD 160.

The MFP 100 also executes a BOX print job. In the BOX print job, the MFP 100 prints an image on a sheet based on image data stored in the HDD 160 and settings received from the operation unit 150.

In addition, the MFP 100 executes a scan and transmission job. In the scan and transmission job, the MFP 100 reads an image of a document with the reader unit 120, generates image data of the read image of the document, and transmits the image data to the PC 101.

Furthermore, the MFP 100 executes a fax transmission job. In the fax transmission job, the MFP 100 reads an image of a document with the reader unit 120, generates image data of the read image of the document, and transmits the image data to an external facsimile apparatus through a telephone circuit (not illustrated).

The MFP 100 receives the aforementioned plurality of jobs and successively stores the jobs in the non-volatile memory 140. The MFP 100 executes the jobs in the order in which the jobs are stored in the non-volatile memory 140.

Although an example in which the MFP 100 executes a plurality of types of jobs has been described herein, the present disclosure is not limited to such an example. The MFP 100 may be configured to execute, among the aforementioned plurality of types of jobs, at least one type of job of printing an image.

Figure 4A:
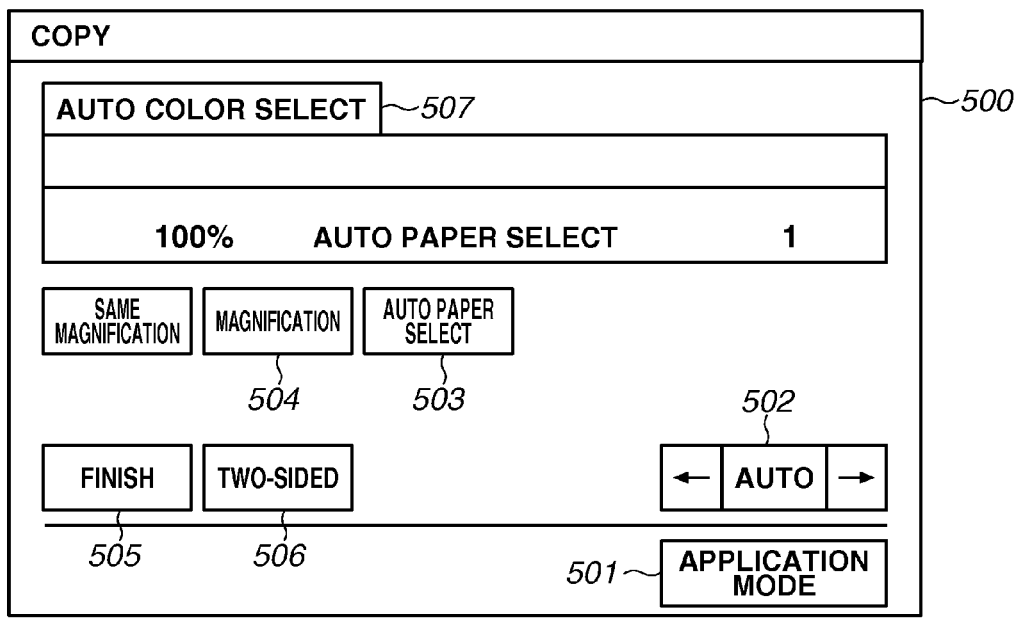
FIGS. 4A and 4B are diagrams illustrating screens according to the present exemplary embodiment.
Figure 4B:
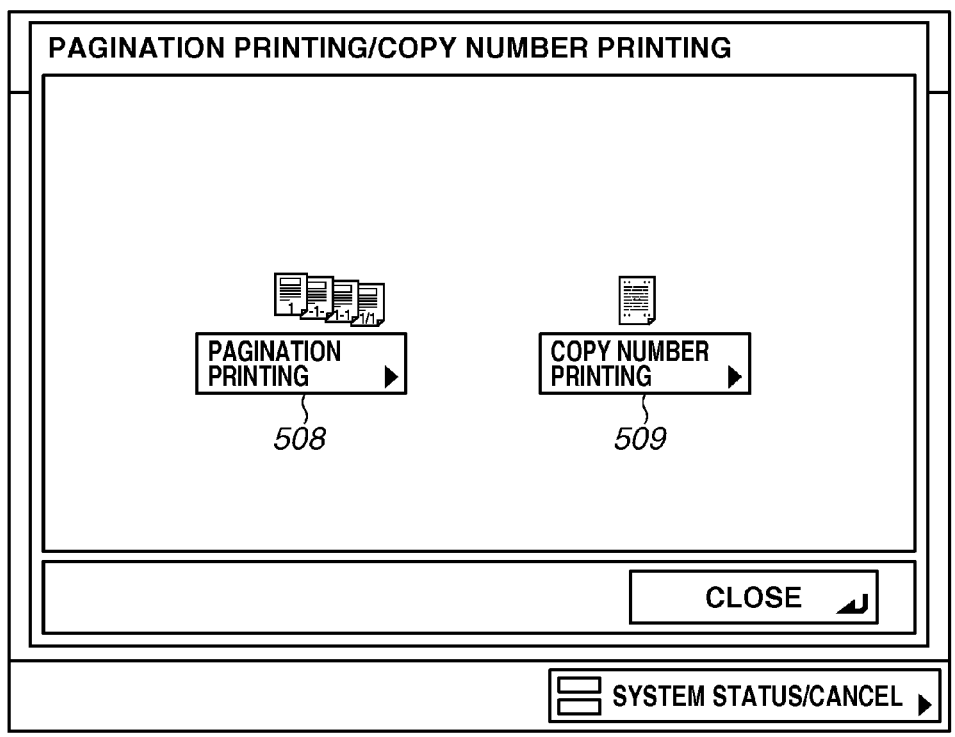

When a copy job is to be executed, the operation unit 150 receives the settings for the copy job from the user through screens illustrated in FIGS. 4A and 4B.

FIG. 4A illustrates an initial screen 500 for copying. This initial screen 500 is displayed on the touch panel unit 6002 when the MFP 100 is started or when the user presses the operation unit power supply switch 6003. The initial screen 500 may also be displayed when the user presses a reset key.

The initial screen 500 includes an application mode key 501, a density adjustment key 502, a paper selection key 503, a magnification setting key 504, a finishing key 505, a two-sided setting key 506, and a color mode setting key 507. The user can configure the settings for a copy job by pressing these keys.

The application mode key 501 is a key for calling a screen for configuring the settings for an application function of copying. For example, when the application mode key 501 is pressed, a screen for configuring the setting for a pagination printing function to print an image with a page number added to the image is called or a screen for configuring the settings for a copy number printing function to print an image with a copy number added to the image is called, and such a screen is displayed on the operation unit 150.

FIG. 4B illustrates an example screen for configuring the setting for the pagination printing function and the copy number printing function. A pagination printing key 508 is a key for printing with a page number added to the image. A copy number printing key 509 is a key for printing with a copy number added to the image.

The density adjustment key 502 is a key for adjusting print density.

The paper selection key 503 is a key for selecting a cassette or a manual feed tray from which a sheet is to be fed.

The magnification setting key 504 is a key for setting the copying magnification.

The two-sided setting key 506 is a key for setting two-sided printing.

The color mode setting key 507 is a key for setting a method to determine whether the document image is a color image or a monochrome image.

When the user operates the numeric keypad 6006 in a state in which the initial screen 500 is displayed, the CPU 111 sets a numerical value corresponding to the operated key as the number of copies. Initially, "1" is set as the default number of copies in the initial screen 500. Here, if the user presses "3" in the numeric keypad 6006, the CPU 111 sets the number of copies to three. If the user presses "1" and "5" successively, the CPU 111 sets the number of copies to 15. When the user presses a reset key, the CPU 111 sets the number of copies to one.

The CPU 111 stores the data set through the screens illustrated in FIGS. 4A and 4B into the RAM 114 as the settings for copying. Then, when the user presses the start key 6005 illustrated in FIG. 3, the CPU 111 executes a copy job in accordance with the print settings stored in the RAM 114.

When the user presses the start key 6005, the MFP 100 having the configuration described above reads a document with the reader unit 120 and stores image data of an image of the read document into the HDD 160. The MFP 100 then generates a copy job based on the stored image data and the settings for copying made by the user, and lays out and prints an image on a sheet based on the generated copy job.

Figure 5A:
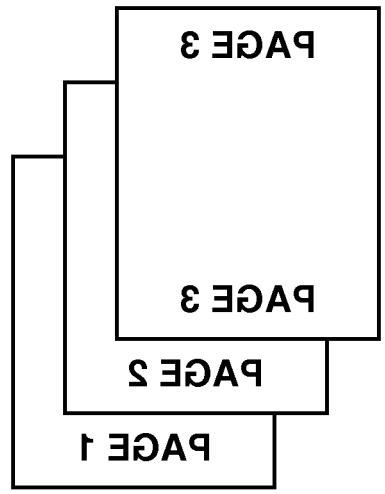
FIGS. 5A and 5B are diagrams illustrating printed materials according to the present exemplary embodiment.
Figure 5B:
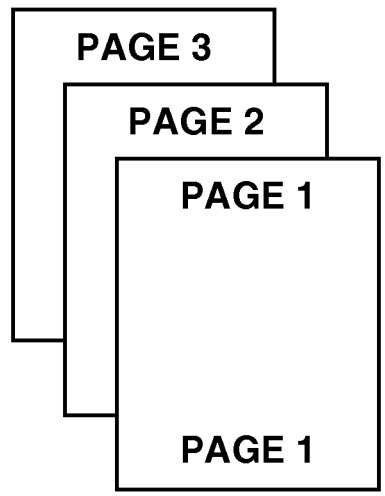

An example will be described in which image data of a document contains a plurality of pages, an image is printed on a plurality of sheets per copy based on the image data of the read document, and the sheets are discharged. First, the CPU 111 lays out an image on a sheet starting from the first page and starts printing from a sheet on which an image has been laid out. Owing to this procedure, the CPU 111 starts printing without waiting for the entire pages to be stored into the HDD 160, and thus the start of printing is brought forward. The CPU 111 then controls the printer unit 130 to reverse the sheet on which an image has been printed and to discharge the sheet in a face-down state. Resulting sheets discharged in this manner are illustrated in FIG. 5A. Although FIG. 5A illustrates the sheets which are displaced relative to one another so that the order in which the sheets are discharged, is easy to understand, the discharged sheets may not be displaced relative to one another, and it is preferable that the sheets be discharged by aligning their edges. Although hereinafter, sheets are similarly depicted so as to be displaced relative to one another, it is preferable that the sheets be discharged by aligning their edges. The sheets illustrated in FIG. 5A are discharged in a face-down state sequentially from the first page, the second page, and to the third page. Since the plurality of sheets is discharged in a face-down state starting from the first page, the user can obtain a sheet stack that is arranged in the correct page order as illustrated in FIG. 5B when the user picks up the plurality of sheets and turns over the sheets. In a case where an image is printed on a plurality of copies of a sheet stack, printing is repeated for each sheet stack through the same procedure.

Figure 6A:
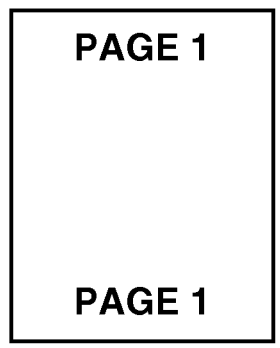
FIGS. 6A and 6B are diagrams illustrating printed materials according to the present exemplary embodiment.
Figure 6B:
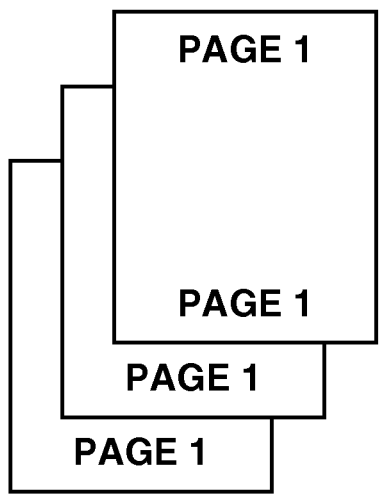

Meanwhile, a case in which an image is printed on a single sheet per copy based on image data of a read document will be described. Here, the copy number is not to be printed. In this case, a sheet sequence does not go out of order even if the sheets are discharged in a face-up state. If, however, the sheets are to be discharged in a face-down state, it takes an extra time by reversing the sheets through a reversing path, and thus it takes a longer time to complete printing. Therefore, in a case where an image is to be printed on a single sheet per copy, the CPU 111 prints the image on a single sheet and discharges the sheet on which the image has been printed in a face-up state without reversing the sheet. A resulting sheet discharged in this manner is illustrated in FIG. 6A. Through this procedure, the time it takes to complete printing can be reduced. In a case where a plurality of copies of a single-sheet document is to be printed, if copy numbers are not printed on the sheets, printing is repeated through the same procedure for each copy. A result obtained when a plurality of copies are discharged is illustrated in FIG. 6B.

Next, an example will be described in which an image is printed on a single sheet per copy based on image data of a read document and copy numbers are to be printed on respective sheets.

Figure 7A:
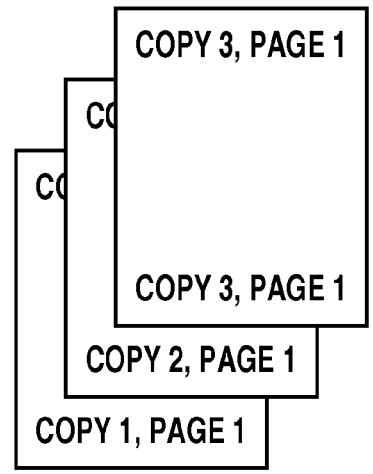
FIGS. 7A, 7B, and 7C are diagrams illustrating printed materials according to the present exemplary embodiment.

In this case, if an image is printed on a single sheet per copy and the sheets are discharged in a face-up state as in the case where the copy numbers are not printed on the sheets, the discharged sheets result in the state illustrated in FIG. 7A. In this case, the sheets do not need to be reversed, and thus an amount of time it takes to complete printing can be reduced. However, since an order of the copy numbers is not correct, the user needs to manually exchange the sheet of the first copy and the sheet of the third copy.

Figure 7B:
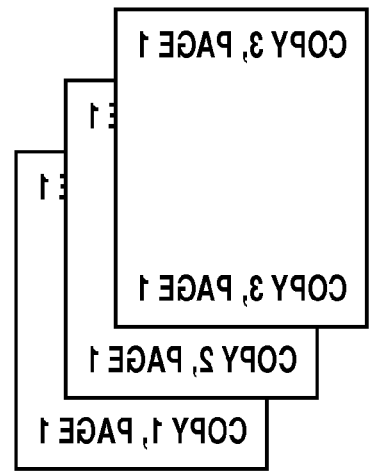

Therefore, according to the present exemplary embodiment, even in a case where an image is printed on a single sheet based on image data, if the copy numbers are to be printed on the sheets, the sheets are discharged in a face-down state. Resulting sheets discharged in a face-down state are illustrated in FIG. 7B. In this manner, the user does not need to rearrange the sheets.

Figure 7C:
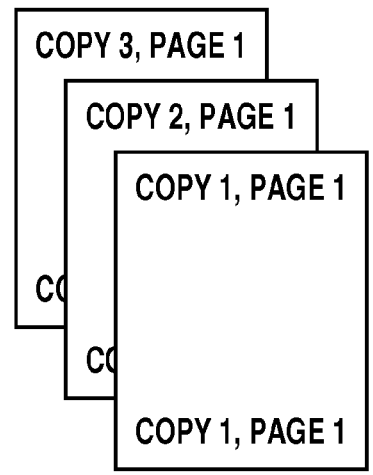

When the user picks up and turns over the plurality of sheets, the user can obtain a sheet stack in which the copy numbers are printed in the correct order as illustrated in FIG. 7C.

When a plurality of sheets is to be printed per copy, regardless of whether the copy numbers are to be printed, the CPU 111 controls the printer unit 130 to discharge the plurality of sheets in a face-down state so that the pages of the plurality of sheets do not go out of order.

Figure 8:
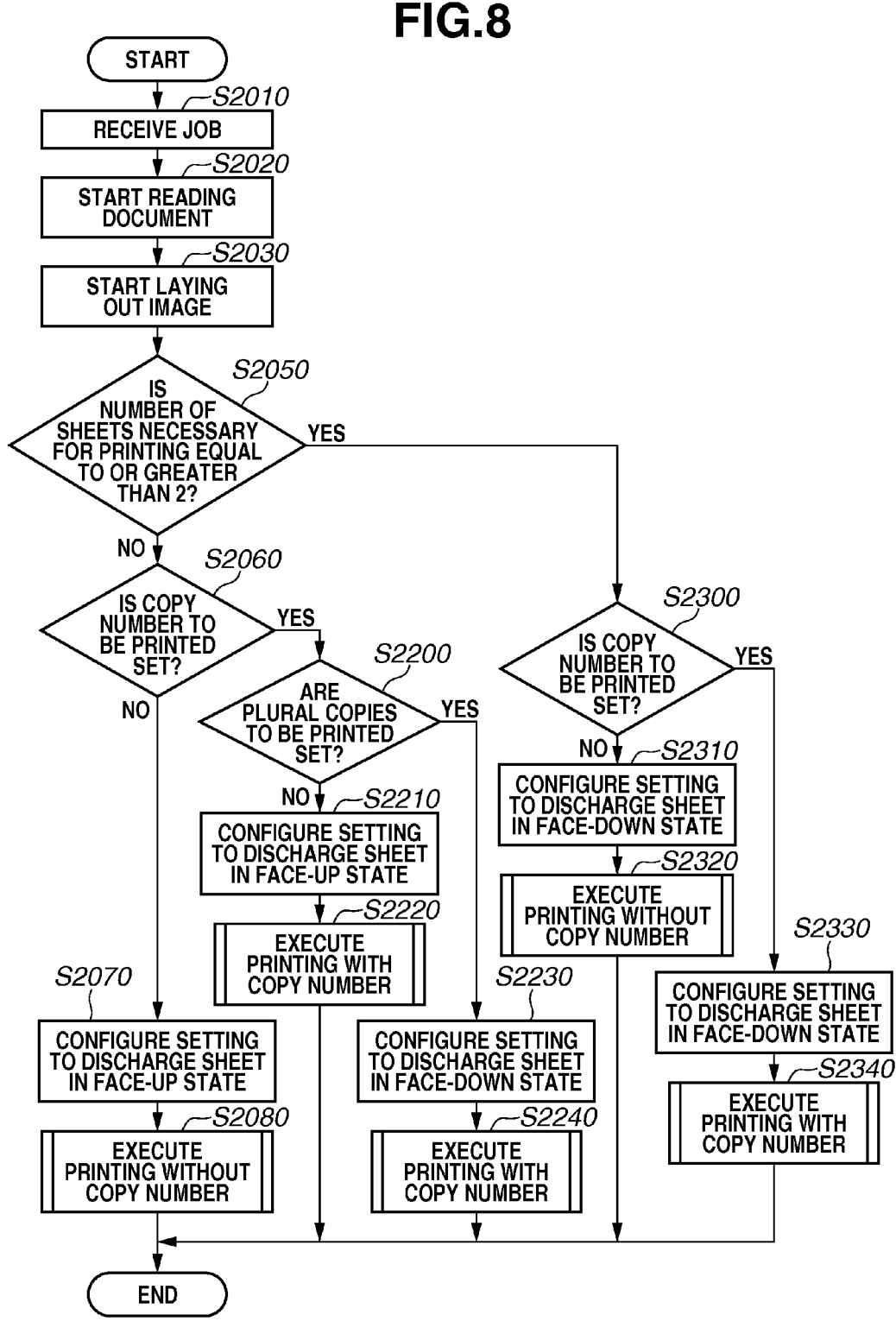
FIG. 8 is a flowchart of a control example according to the present exemplary embodiment.

Next, execution control of a copy job by the MFP 100 according to the present exemplary embodiment will be described with reference to FIG. 8. The flowchart illustrated in FIG. 8 is implemented as the CPU 111 loads a program stored in the ROM 115 onto the RAM 114 and executes the program.

In step S2010, the CPU 111 receives a job. Specifically, when the CPU 111 has received the settings for copying through the screens illustrated in FIGS. 4A and 4B and the user presses the start key 6005, the CPU 111 determines that the copy job has been received. The CPU 111 stores the settings for the received copy job into the RAM 114.

In step S2020, the CPU 111 causes the reader unit 120 to start reading a document. The reader unit 120 may either read a document placed on the document feed unit 122 by conveying the document or may read a document placed on the document positioning plate. When the reader unit 120 reads the document, the scanner control unit 121 generates image data of an image of the read document, and the CPU 111 stores the generated image data into the HDD 160. In a case where a document placed on the document positioning plate is read, the CPU 111 inquires of the user through the operation unit 150 whether there is an additional document to be read each time the reader unit 120 finishes reading a single document. If the user indicates that there is a subsequent document to be read, the CPU 111 stands by for reading the subsequent document, and the CPU 111 starts reading the subsequent document when the user presses the start key 6005. Meanwhile, if the user indicates that there is no subsequent document to be read, the CPU 111 recognizes the stored document obtained by reading the first document through the document which the user has indicated as the final document, as image data to be printed by the copy job received in step S2010.

In step S2030, the CPU 111 starts laying out an image on a sheet based on the image data of the job stored in the HDD 160 and the settings for copying received from the user through the operation unit 150. For example, in a case where the user has set 1-in-1 and one-sided printing as the settings for copying, the CPU 111 lays out an image for one page on one side of the sheet. Thus, a single sheet is necessary for printing each page of the image data stored in the HDD 160. Meanwhile, in a case where the user has set 2-in-1 and one-sided printing as the settings for copying, the CPU 111 lays out an image for two pages on one side of the sheet. In this case, only a single sheet is used for printing two pages of the image data stored in the HDD 160. In addition, in a case where the user has set 1-in-1 and two-sided printing as the settings for copying, the CPU 111 lays out an image for one page on a first side of the sheet and lays out an image for another page on a second side of the sheet. In this case, a single sheet is used for printing two pages of the image data stored in the HDD 160. Furthermore, in a case where the user has set 2-in-1 and two-sided printing as the settings for copying, the CPU 111 lays out an image for two pages on a first side of the sheet and lays out an image for two pages on a second side of the sheet. In this case, only a single sheet is used for printing four pages of the image data stored in the HDD 160. In this manner, the CPU 111 lays out an image on the sheet.

In step S2050, the CPU 111 determines whether the number of sheets for printing a single copy is equal to or greater than two based on the result of laying out the image in step S2030. Specifically, if the CPU 111 determines that the number of sheets for printing a single copy is one based on the result of laying out the image in step S2030 (No in step S2050), the processing proceeds to step S2060. If the CPU 111 determines that the number of necessary sheets per copy is equal to or greater two (Yes in step S2050), the processing proceeds to step S2300.

In step S2060, the CPU 111 determines whether the user has configured the setting to print the copy numbers, by referring to the settings for copying stored in the RAM 114. If the user has configured the setting to print the copy numbers through the copy number printing key 509 illustrated in FIG. 4B, information indicating that the copy numbers are to be printed is stored in the RAM 114. If the user has not configured the setting to print the copy numbers through the copy number printing key 509 illustrated in FIG. 4B, information indicating that the copy numbers are not to be printed is stored in the RAM 114. If the CPU 111 determines that the copy numbers are to be printed (Yes in step S2060), the processing proceeds to step S2200. If the CPU 111 determines that the copy numbers are not to be printed (No in step S2060), the processing proceeds to step S2070.

In step S2070, the CPU 111 configures the settings so that the sheet is discharged in a face-up state. In this case, a single sheet is discharged per copy. Since the sheet is discharged without being reversed, the time it takes to complete printing can be reduced. In addition, since the copy numbers are not printed on the sheets, the copy numbers do not go out of order. It is to be noted that, in step S2070, regardless of whether the specified number of copies is one or more, the sheet is discharged in a face-up state. This is because the copy numbers are not printed on the sheets, even in a case where a single copy is printed as illustrated in FIG. 6A, or even in a case where a plurality of copies is printed as illustrated in FIG. 6B, the sheets can be discharged in the correct order in a face-up state.

In step S2080, the CPU 111 controls the printer unit 130 to print the sheets without the copy numbers. The processing in step S2080 will be described in detail with reference to FIG. 9.

If the processing proceeds from step S2060 to step S2200, in step S2200, the CPU 111 determines whether the user has configured the setting to print a plurality of copies by referring to the settings for copying stored in the RAM 114. The number of copies is set in advance by the user through the numeric keypad 6006 illustrated in FIG. 3. If the number of copies is set to one, the CPU 111 determines that the user has not configured the setting to print a plurality of copies (No in step S2200), and the processing proceeds to step S2210. Meanwhile, if the number of copies is set to two or greater, the CPU 111 determines that the user has configured the setting to print a plurality of copies (Yes in step S2200), and the processing proceeds to step S2230.

In step S2210, the CPU 111 configures the settings so that the sheet is not reversed and is discharged in a face-up state. In this case, a single sheet is discharged per copy, and since the sheet is discharged without being reversed, the time it takes to complete printing can be reduced. In addition, since the copy numbers are not printed on the sheets, the copy numbers do not go out of order.

In step S2200, the CPU 111 controls the printer unit 130 to execute printing with the copy number added by the copy number adding unit 180. The processing in step S2200 will be described in detail with reference to FIG. 10.

Meanwhile, if the processing proceeds from step S2200 to step S2230, in step S2230, the CPU 111 configures the settings so that the sheets are discharged in a face-down state. In this case, a plurality of copies of a single-sheet document is discharged. If the sheets are discharged in a face-up state, the copy numbers do not run correctly as illustrated in FIG. 7A. Therefore, in step S2230, the CPU 111 configures the settings so that the sheets are discharged in a face-down state, and the CPU 111 controls the printer unit 130 to produce an output result as illustrated in FIG. 7B. Through this procedure, the user does not need to rearrange the discharged sheets.

In step S2240, the CPU 111 controls the printer unit 130 to execute printing with the copy numbers added by the copy number adding unit 180. The processing in step S2240 will be described in detail with reference to FIG. 10.

If the processing proceeds from step S2050 to step S2300, in step S2300, the CPU 111 determines whether the user has configured the setting to print the copy numbers by referring to the settings for copying stored in the RAM 114. The CPU 111 makes a determination by a method similar to the method described in step S2060. If the CPU 111 determines that the copy numbers are not to be printed (No in step S2300), the processing proceeds to step S2310. If the CPU 111 determines that the copy numbers are to be printed (Yes in step S2300), the processing proceeds to step S2330.

In step S2310, the CPU 111 configures the settings so that the sheets are discharged in a face-down state. In this case, while the copy numbers are not printed, a plurality of sheets is discharged per copy. If the sheets are discharged in a face-up state starting from the first page, the pages go out of order. Meanwhile, if the printing is started from the final page after the image data of the entire pages has been stored in the HDD 160, the start of the printing is delayed. Therefore, the CPU 111 configures the settings so that the sheets are printed from the first page and the sheets are then reversed and discharged in a face-down state.

In step S2320, the CPU 111 controls the printer unit 130 to execute printing without the copy numbers. The processing in step S2320 will be described in detail with reference to FIG. 9.

In step S2330, the CPU 111 configures the settings so that the sheets are discharged in a face-down state. In this case, a plurality of sheets is discharged per copy, and if the sheets are discharged in a face-up state starting from the first page, the pages go out of order. In addition, in a case where a plurality of copies is to be printed, if the sheets are discharged in a face-up state starting from the first page, the copy numbers go out of order as well. Meanwhile, if the printing is started from the final page after the image data of the entire pages has been stored in the HDD 160, the start of the printing is delayed. Therefore, the CPU 111 configures the settings so that the sheets are printed from the first page and the sheets are then reversed and discharged in a face-down state. In other words, if the number of sheets used for printing a single copy is equal to or greater than two, regardless of whether the copy numbers are to be printed and regardless of whether a plurality of copies is to be printed, the CPU 111 controls the printer unit 130 such that the sheets are discharged in a face-down state.

In step S2340, the CPU 111 controls the printer unit 130 to execute printing with the copy numbers added by the copy number adding unit 180.

Figure 9:
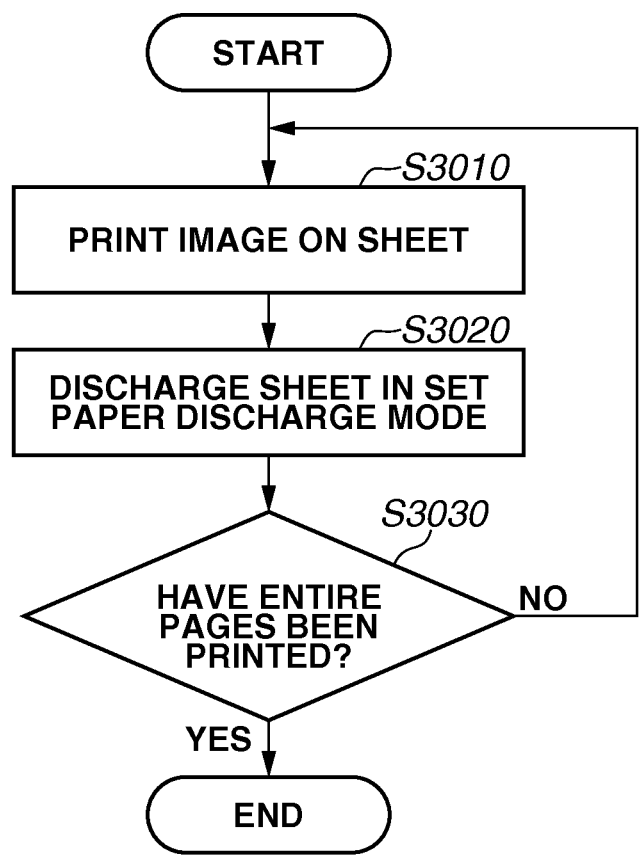
FIG. 9 is a flowchart of a control example according to the present exemplary embodiment.

Next, the processing of executing printing without the copy numbers in step S2080 and step S2320 will be described with reference to FIG. 9. The flowchart illustrated in FIG. 9 is implemented as the CPU 111 loads a program stored in the ROM 115 onto the RAM 114 and executes the program.

In step S3010, the CPU 111 causes the paper feed unit 132 to feed a single sheet and prints an image on the fed sheet based on image data.

In step S3020, the CPU 111 controls the printer unit 130 such that the printer unit 130 discharges the sheet on which the image has been printed in a discharge mode set in the processing of FIG. 8. In other words, if the sheet is to be discharged in a face-up state, the CPU 111 controls the printer unit 130 to discharge the sheet on which the image has been printed in a face-up state. Meanwhile, if the sheet is set to be discharged in a face-down state, the CPU 111 controls the printer unit 130 to discharge the sheet on which the image has been printed in a face-down state.

In step S3030, the CPU 111 determines whether the entire pages have been printed. The CPU 111 determines that the entire pages have not been printed if there is still image data to be printed in the HDD 160. Meanwhile, the CPU 111 determines that the entire pages have been printed if there is no more image data to be printed. If the CPU 111 determines that the entire pages have not been printed (No in step S3030), the processing returns to step S3010. If the CPU 111 determines that the entire pages have been printed (Yes in step S3030), the processing is terminated.

Figure 10:
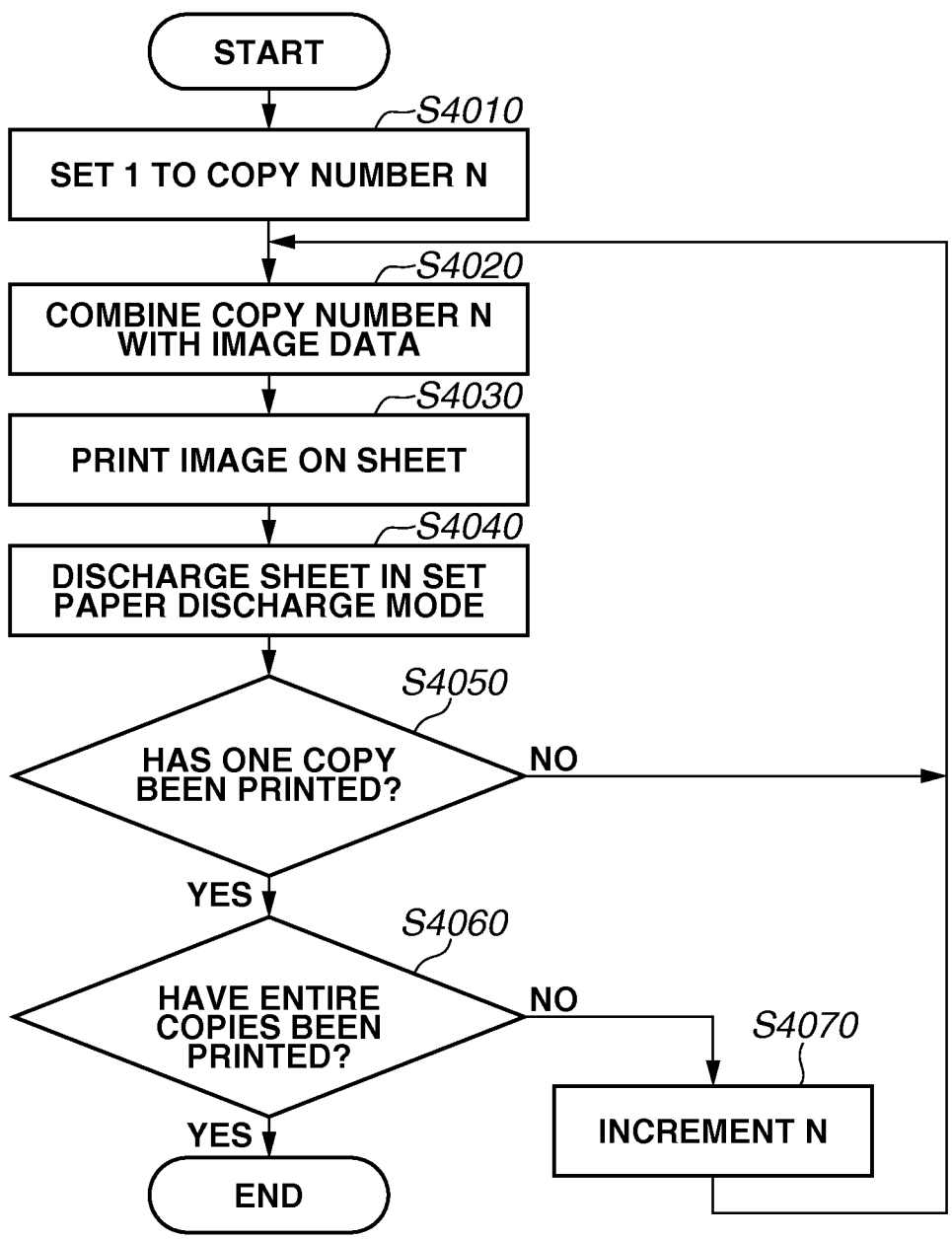
FIG. 10 is a flowchart of a control example according to the present exemplary embodiment.

Next, the processing of executing printing with the copy numbers in step S2220, step S2240, and step S2340 will be described with reference to FIG. 10. The flowchart illustrated in FIG. 10 is implemented as the CPU 111 loads a program stored in the ROM 115 onto the RAM 114 and executes the program.

In step S4010, the CPU 111 prepares a variable N in the RAM 114 and sets 1 to N.

In step S4020, the CPU 111 notifies the copy number adding unit 180 of the value of N stored in the RAM 114 and causes the copy number adding unit 180 to generate copy number image data that indicates the value of N. The CPU 111 then combines the copy number image data generated by the copy number adding unit 180 with the image data to be printed stored in the HDD 160.

In step S4030, the CPU 111 causes the paper feed unit 132 to feed a single sheet and prints an image that includes a copy number on the fed sheet based on the image data with which the copy number image data has been combined.

In step S4040, the CPU 111 controls the printer unit 130 such that the printer unit 130 discharges the sheet on which the image has been printed in a discharge mode set in the processing of FIG. 8. In other words, if the sheet is to be discharged in a face-up state, the CPU 111 controls the printer unit 130 to discharge the sheet on which the image has been printed in a face-up state. Meanwhile, if the sheet is to be discharged in a face-down state, the CPU 111 controls the printer unit 130 to discharge the sheet on which the image has been printed in a face-down state.

In step S4050, the CPU 111 determines whether printing of a single copy is completed. If there is still image data to be printed in the HDD 160, the CPU 111 determines that printing of a single copy is not completed (No in step S4050), and the processing returns to step S4020. Meanwhile, if there is no more image data to be printed in the HDD 160, the CPU 111 determines that printing of a single copy is completed (Yes in step S4050), and the processing proceeds to step S4060.

In step S4060, the CPU 111 determines whether the entire pages have been printed. If there is still image data to be printed in the HDD 160, the CPU 111 determines that the entire pages have not been printed. Meanwhile, if there is no more image data to be printed, the CPU 111 determines that the entire pages have been printed. If the CPU 111 determines that the entire pages have not been printed (No in step S4060), the processing proceeds to step S4070. If the CPU 111 determines that the entire pages have been printed (Yes in step S4060), the processing is terminated.

In step S4070, the CPU 111 increments the value of N stored in the RAM 114, and the processing then returns to step S4020 for printing a subsequent copy.

Through the control described above, in a case where copy numbers are printed on a single-sheet document and the document is discharged, the time it takes to complete printing can be prevented from being extended, and the copy numbers can be prevented from going out of order.

In the exemplary embodiment described above, an example has been described in which the sheets are discharged in a face-down state if the CPU 111 determines in step S2200 that a plurality of copies is to be printed and the sheets are discharged in a face-up state if the CPU 111 determines in step S2200 that a plurality of copies is not to be printed. In other words, an example has been described in which the CPU 111 determines whether the sheets are to be discharged in a face-up state or in a face-down state based on whether a plurality of copies of a single-sheet document is printed or a single copy of a single-sheet document is printed. The present disclosure, however, is not limited thereto. For example, step S2200 is not necessarily needed. If the CPU 111 determines in step S2060 that the copy numbers are to be printed, regardless of the specified number of copies, the CPU 111 may control the printer unit 130 to discharge the sheets in a face-down state. In other word, if the copy numbers are to be printed, even if the specified number of copies is one, the sheets may be discharged in a face-down state.

In the first exemplary embodiment, an example has been described in which when copy numbers are printed on a single-sheet document per copy and the plurality of copies is output, an image in which a copy number is added is printed sequentially starting from 1 and the sheet on which the image has been printed is discharged in a face-down state.

Figure 11:
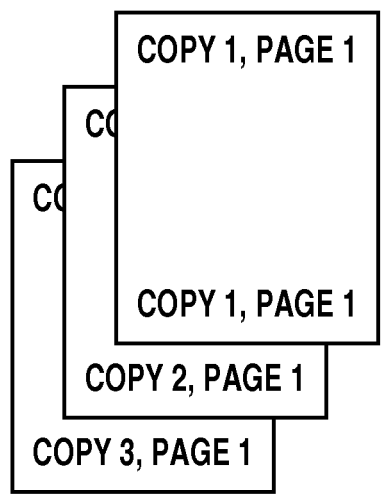
FIG. 11 is a diagram illustrating a printed material according to the present exemplary embodiment.

In a second exemplary embodiment, an example will be described in which when copy numbers are printed on a single-sheet document per copy and the plurality of copies is output, an image in which a copy number is added is printed sequentially starting from a final copy and the sheet on which the image has been printed is discharged in a face-up state. This results in a discharged output material as illustrated in FIG. 11. The final copy corresponds to the number of copies which the user has specified through the operation unit 150.

The basic configuration of the MFP 100 is similar to that of the first exemplary embodiment, and thus differences between the first and second exemplary embodiments will be described hereinafter.

Figure 12:
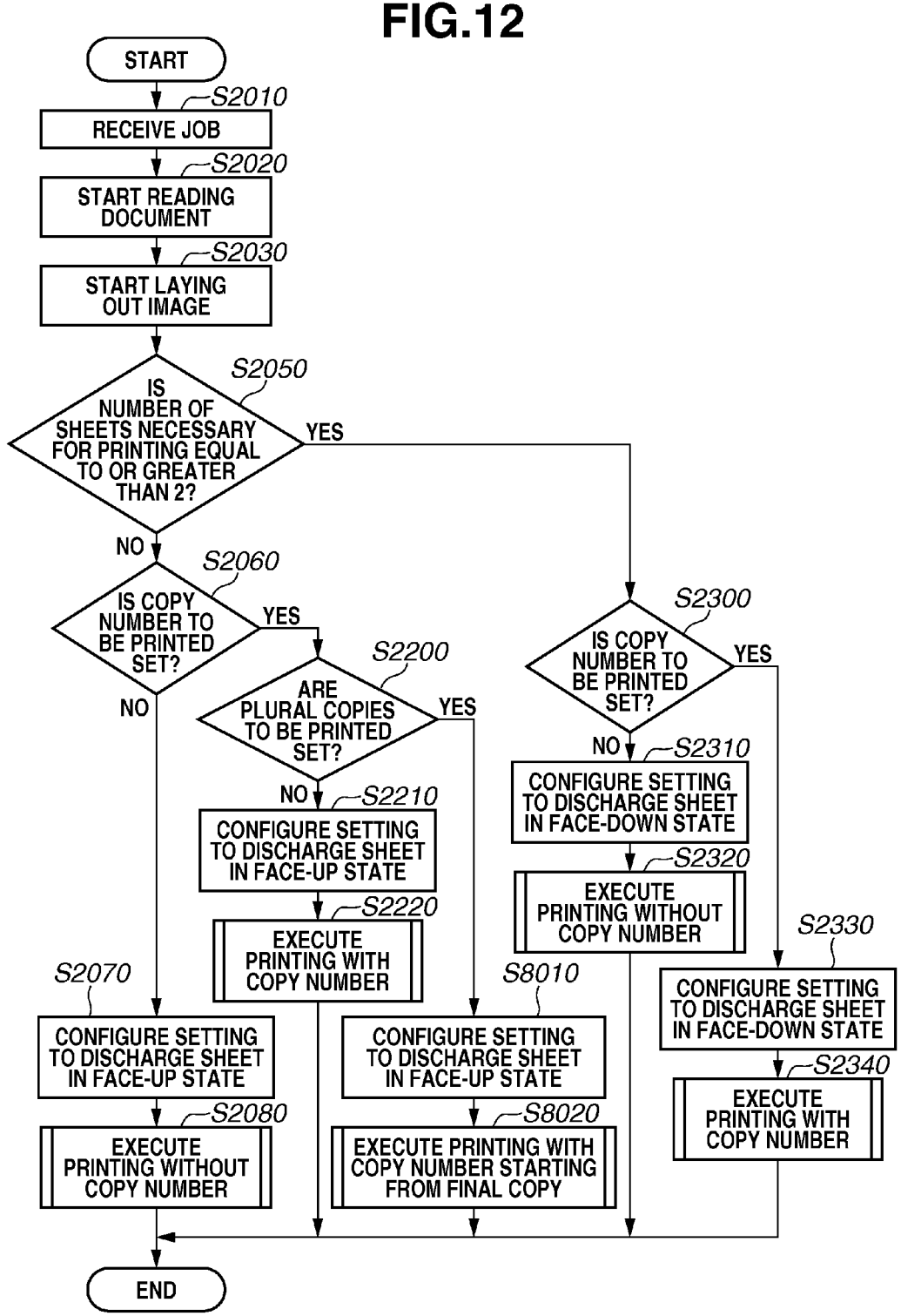
FIG. 12 is a flowchart of a control example according to the present exemplary embodiment.

FIG. 12 is a flowchart illustrating control according to the present exemplary embodiment. The flowchart illustrated in FIG. 12 is implemented as the CPU 111 loads a program stored in the ROM 115 onto the RAM 114 and executes the program. Steps that are identical to the steps in the flowchart illustrated in FIG. 8 are given identical numbers. The flowchart in FIG. 12 differs from the flowchart in FIG. 8 in that step S8010 is carried out in place of step S2230 and step S8020 is carried out in place of step S2240.

In step S8010, the CPU 111 configures the settings so that the sheets are discharged in a face-up state.

In step S8020, the CPU 111 controls the printer unit 130 such that the printer unit 130 prints an image in which a copy number is added sequentially starting from a final copy and discharges the sheet on which the image has been printed in a face-up state.

In step S8020, the CPU 111 carries out control illustrated in FIG. 13.

The flowchart illustrated in FIG. 13 is implemented as the CPU 111 loads a program stored in the ROM 115 onto the RAM 114 and executes the program.

In step S9010, the CPU 111 prepares a variable N in the RAM 114 and sets the number of copies (total number of copies) specified by the user to N.

In step S9020, the CPU 111 notifies the copy number adding unit 180 of the value of N stored in the RAM 114 and causes the copy number adding unit 180 to generate copy number image data that indicates the value of N. The CPU 111 then combines the copy number image data generated by the copy number adding unit 180 with print target image data stored in the HDD 160.

In step S9030, the CPU 111 causes the paper feed unit 132 to feed a single sheet and prints an image that includes the copy number on the fed sheet based on the image data with which the copy number image data has been combined.

In step S9040, the CPU 111 controls the printer unit 130 so that the printer unit 130 discharges the sheet on which the image has been printed in a discharge mode set in the processing of FIG. 12. In other words, since the sheet is to be discharged in a face-up state in step S8010, the CPU 111 controls the printer unit 130 to discharge the sheet on which the image has been printed in a face-up state.

In step S9050, the CPU 111 determines whether printing of a single copy is completed. If there is still image data to be printed in the HDD 160, the CPU 111 determines that printing of a single copy is not completed (No in step S9050), and the processing returns to step S9020. Meanwhile, if there is no more image data to be printed in the HDD 160, the CPU 111 determines that printing of a single copy is completed (Yes in step S9050), and the processing proceeds to step S9060.

In step S9060, the CPU 111 determines whether the entire pages have been printed. If there is still image data to be printed in the HDD 160, the CPU 111 determines that the entire pages have not been printed. Meanwhile, if there is no more image data to be printed, the CPU 111 determines that the entire pages have been printed. If the CPU 111 determines that the entire pages have not been printed (No in step S9060), the processing proceeds to step S9070. If the CPU 111 determines that the entire pages have been printed (Yes in step S9060), the processing is terminated.

In step S9070, the CPU 111 decrements the value of N stored in the RAM 114, and the processing then returns to step S9020 to print a subsequent copy.

Through the control described above, in a case where copy numbers are printed on a single-sheet document the printed document is discharged, an amount of the time it takes to complete printing can be prevented from being extended, and the copy numbers can be prevented from going out of order.

In the exemplary embodiment described above, an example has been described in which the sheets are discharged in a face-down state if the CPU 111 determines in step S2200 that a plurality of copies is to be printed and the sheets are discharged in a face-up state if the CPU 111 determines in step S2200 that a plurality of copies is not to be printed. The present disclosure, however, is not limited thereto. For example, if step S2200 is not necessarily needed, and if the CPU 111 determines in step S2060 that the copy numbers are to be printed, regardless of the specified number of copies, the CPU 111 may control the printer unit 130 to discharge the sheets in a face-down state. In other words, if the copy numbers are to be printed, even if the specified number of copies is one, the sheets may be discharged in a face-down state.

Other Embodiments

Although a case in which a copy job is executed has been described in the exemplary embodiments above, the exemplary embodiments may also be applied to a print job in which an image is printed based on image data received from the PC 101. In that case, in step S2020, the image data and the settings for the print job are received from the PC 101. In the PC 101, the user generates image data by using application software, sets the number of copies or select whether to print the copy numbers by using a printer driver, and issues an instruction to transmit the data to the MFP 100. Upon receiving such a transmission instruction, the PC 101 generates a print job that includes the image data and the settings for the print job and transmits the generated print job to the MFP 100. The MFP 100 then lays out an image on a sheet based on the image data and the settings for the print job included in the received print job and prints the laid-out image.

Although the copy numbers have been described as an example in the exemplary embodiments above, the copy numbers may be indicated by alphabets (A, B, C) instead of numerals (1, 2, 3) as long as the copy numbers indicate a sequence. In addition, instead of the copy numbers, names of people to which the copies are to be distributed may be printed in alphabetical order on the respective copies. As described above, copy numbers are printed on sheets and a distributor distributes the sheets to a plurality of users. In such a case, the copy numbers and the users receiving the sheets with the respective copy numbers are managed, so that even if information on the sheet is leaked, the copy numbers may make it possible to identify which receiver has leaked the sheet.

An exemplary embodiment of the present disclosure can also be achieved by carrying out the following processing. A storage medium on which software program codes for realizing the functions of the exemplary embodiments described above are stored is supplied to an apparatus (or a system), and a computer (CPU, microprocessor unit (MPU)) of the apparatus (or the system) reads out the program codes stored in the storage medium. In this case, the program codes read out from the storage medium realize the functions of the exemplary embodiments described above. In addition, the program codes and the storage medium on which the program codes are stored constitute the present disclosure. The storage medium may, for example, be a RAM or a ROM. Alternatively, the storage medium may be a compact disc (CD), a digital versatile disc (DVD), A Blu-ray (registered trademark) Disc, a flash memory, a memory card, or the like. Furthermore, one or a plurality of functions of the exemplary embodiments described above may be realized by a single processor or by a plurality of processors or may be realized by a plurality of computers on a network.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-252287 filed Dec. 5, 2013, which is hereby incorporated by reference herein in its entirety.

What is claimed is:

1. A printing apparatus comprising:
   a determination unit configured to determine whether a copy number is to be printed on a sheet; and
   a control unit configured to perform control such that, in a case where processing of printing an image on a single sheet per copy is carried out for a plurality of copies and the determination unit determines that the copy number is not to be printed on the sheet, the sheet on which the image is printed is discharged in a face-up state, and to perform control such that, in a case where processing of printing an image on a single sheet per copy is carried out for a plurality of copies and the determination unit determines that the copy number is to be printed on the sheet, the sheet on which the image is printed is discharged in a face-down state.

2. The printing apparatus according to claim 1, wherein the control unit performs control such that, in a case where the processing of printing an image on a single sheet per copy is carried out for a single copy, the sheet on which the image is printed is discharged in a face-up state even in a case where the copy number is printed on the sheet.

3. The printing apparatus according to claim 1, wherein the control unit controls such that, in a case where the processing of printing an image on a plurality of sheets per copy is carried out, the sheet on which the image is printed is discharged in a face-down state regardless of whether the copy number is printed on the sheet.

4. The printing apparatus according to claim 1, further comprising:
   a reversing path configured to reverse a front and a back of the sheet on which the image is printed,
   wherein the control unit performs control such that, in a case where the sheet is discharged in a face-up state, the sheet on which the image is printed is discharged without being reversed by the reversing path, and performs control such that, in a case where the sheet is discharged in a face-down state, the sheet on which the image is printed is discharged in a face-down state.

5. The printing apparatus according to claim 1, further comprising:
   a copy number adding unit configured to add a copy number to image data,
   wherein the control unit performs control such that, in a case where the copy number is to be printed on the sheet, the image is printed on the sheet based on the image data to which the copy number is added by the copy number adding unit.

6. The printing apparatus according to claim 1, further comprising:
   a reading unit configured to read a document,
   wherein the control unit performs control such that an image of the document read by the reading unit is printed on a sheet.

7. A printing apparatus comprising:
   a printing unit configured to print an image on a sheet;
   a determination unit configured to determine whether a copy number is to be printed on the sheet; and
   a control unit configured to perform control such that, in a case where the printing unit is to print an image on a single sheet per copy and the determination unit determines that the copy number is not to be printed on the sheet, sheets are discharged in a face-up state starting from a sheet on which a first copy number is added, and to perform control such that, in a case where the printing unit is to print an image on a single sheet per copy and the determination unit determines that the copy number is to be printed on the sheet, sheets are discharged in a face-up state starting from a sheet on which a copy number corresponding to a specified total number of copies is added.

8. The printing apparatus according to claim 7, further comprising:
   a reversing path configured to reverse a front and a back of the sheet on which the image is printed,
   wherein the control unit performs control such that, in a case where the sheet is discharged in a face-up state, the sheet on which the image is printed is discharged without being reversed by the reversing path, and performs control such that, in a case where the sheet is discharged in a face-down state, the sheet on which the image is printed is discharged in a face-down state.

9. The printing apparatus according to claim 7, further comprising:
   a copy number adding unit configured to add a copy number to image data,
   wherein the control unit performs control such that, in a case where the copy number is to be printed on the sheet, the image is printed on the sheet based on the image data on which the copy number is added by the copy number adding unit.

10. The printing apparatus according to claim 7, further comprising:
    a reading unit configured to read a document,
    wherein the control unit performs control such that an image of the document read by the reading unit is printed on a sheet.

11. A printing apparatus, comprising:
    a printing unit configured to print an image on a sheet;
    a determination unit configured to determine whether a copy number is to be printed on the sheet; and
    a control unit configured to perform control, in a case where the printing unit is to print an image on a single sheet per copy, in such a manner that it is determined whether to discharge the sheet in a face-down state or in a face-up state based on whether the copy number is to be printed on the sheet.

12. A method for controlling a printing apparatus, the method comprising:
    determining whether a copy number is to be printed on a sheet; and
    performing control such that, in a case where print processing of printing an image on a single sheet per copy is carried out for a plurality of copies and the determining determines that the copy number is not to be printed on the sheet, the sheet on which the image is printed is discharged in a face-up state, and performing control such that, in a case where processing of printing an image on a single sheet per copy is carried out for a plurality of copies and the determining determines that the copy number is to be printed on the sheet, the sheet on which the image is printed is discharged in a face-down state.

13. A non-transitory computer-readable storage medium storing a program for causing a computer to implement a method for controlling a printing apparatus, the method comprising:
    determining whether a copy number is to be printed on a sheet; and
    performing control such that, in a case where processing of printing an image on a single sheet per copy is carried out for a plurality of copies and it is determined that the copy number is not to be printed on the sheet, the sheet on which the image is printed is discharged in a face-up state, and performing control such that, in a case where processing of printing an image on a single sheet per copy is carried out for a plurality of copies and it is determined that the copy number is to be printed on the sheet, the sheet on which the image is printed is discharged in a face-down state.

* * * * *